United States Patent [19]

Dahlgren et al.

[11] Patent Number: 5,357,854
[45] Date of Patent: Oct. 25, 1994

[54] METHOD FOR HIGH-SPEED CALENDERING

[75] Inventors: Harvey Dahlgren, Irving; Scott R. Johnson, Lewisville, both of Tex.

[73] Assignee: Epic Products International Corp., Arlington, Tex.

[21] Appl. No.: 130,386

[22] Filed: Oct. 1, 1993

Related U.S. Application Data

[62] Division of Ser. No. 928,358, Aug. 12, 1992, Pat. No. 5,275,096.

[51] Int. Cl.⁵ .................. D21G 1/00; B30B 15/34
[52] U.S. Cl. .................. 100/38; 100/93 RP; 100/153; 100/173; 162/224; 162/225
[58] Field of Search ............ 100/35, 38, 93 P, 93 RP, 100/151–153, 173; 118/101, 103, 106, 112, 116; 162/135, 224, 225; 271/204, 272, 277, 309

[56] References Cited

U.S. PATENT DOCUMENTS

| | | | |
|---|---|---|---|
| 161,242 | 3/1875 | Kivlan et al. | 100/173 |
| 746,124 | 12/1903 | Mosher . | |
| 774,573 | 11/1904 | Fenner . | |
| 778,845 | 5/1905 | Peters et al. | 100/152 |
| 849,181 | 4/1907 | Yoerg | 100/173 |
| 965,336 | 7/1910 | Schmidt et al. | 100/153 |
| 1,767,539 | 6/1930 | Mason | 162/225 X |
| 2,270,038 | 1/1942 | Corbin, Jr. | 118/101 X |
| 2,277,426 | 3/1942 | Wolf et al. | 100/93 RP X |
| 2,435,881 | 2/1948 | Faeber . | |
| 2,609,733 | 9/1952 | Honnig | 162/225 X |
| 2,982,245 | 5/1961 | Curler et al. | 118/101 X |
| 3,604,344 | 9/1971 | Ostram | 100/153 X |
| 4,241,659 | 12/1980 | Fischer | 101/231 |
| 4,629,176 | 12/1986 | Ceelen | 271/204 |
| 4,779,717 | 10/1988 | Eberle | 198/803.8 |
| 5,056,773 | 10/1991 | Weisgerber | 271/204 |

FOREIGN PATENT DOCUMENTS

| | | | |
|---|---|---|---|
| 2145749 | 3/1973 | Fed. Rep. of Germany | 100/93 RP |
| 8281 | 10/1844 | France | 100/35 |
| 36009 | 1/1968 | German Democratic Rep. | 100/93 RP |
| 10773 | of 1845 | United Kingdom | 100/151 |
| 26951 | of 1912 | United Kingdom | 118/103 |
| 1162982 | 9/1969 | United Kingdom . | |
| 2136027 | 9/1984 | United Kingdom | 100/93 RP |

OTHER PUBLICATIONS

IBM Bulletin, "Sheet Removal From A Drum," Battison et al., Sep., 1977.

Primary Examiner—Stephen F. Gerrity
Attorney, Agent, or Firm—Burns, Doane, Swecker & Mathis

[57] ABSTRACT

A sheet calendering method and apparatus including a calendering cylinder, a delivering cylinder, and a conveyor for transporting sheets between the calendering cylinder and the delivering cylinder; wherein the conveyor includes two flexible elongated members forming parallel endless loops around the calendering and delivering cylinders, a plurality of support members attached between the parallel loops, and a plurality of calendering plates each linked to an adjacent plate by the support members to form an endless belt.

12 Claims, 6 Drawing Sheets

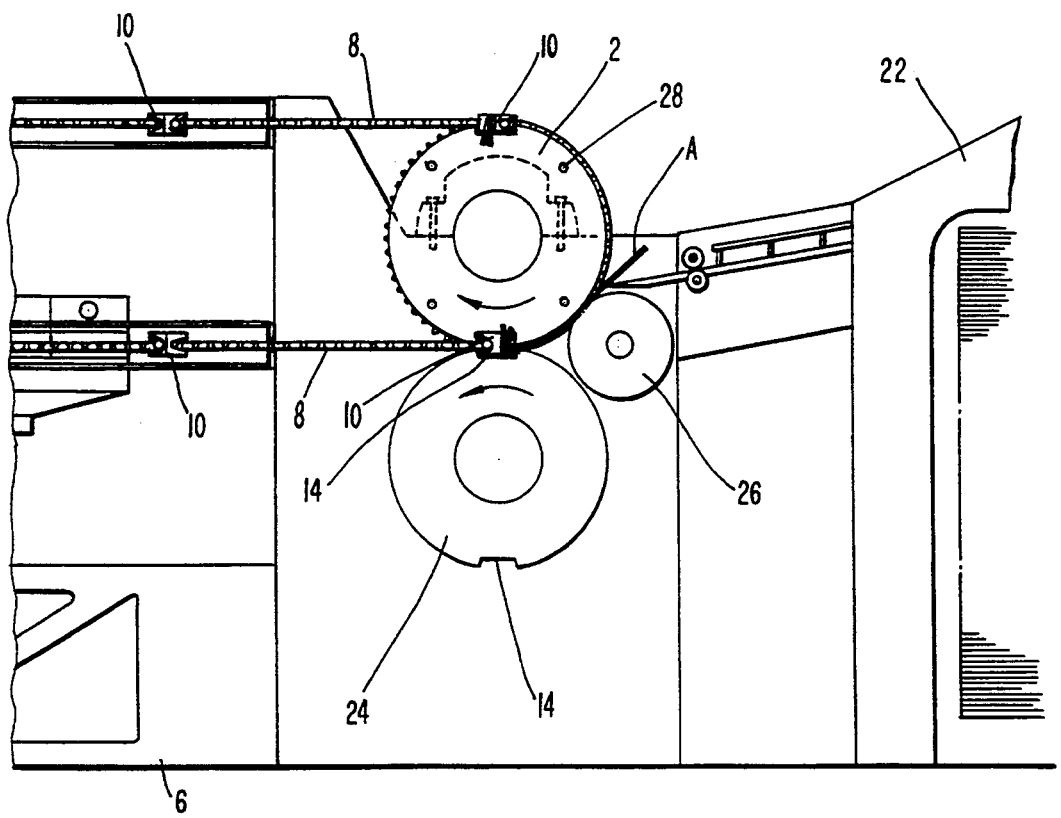
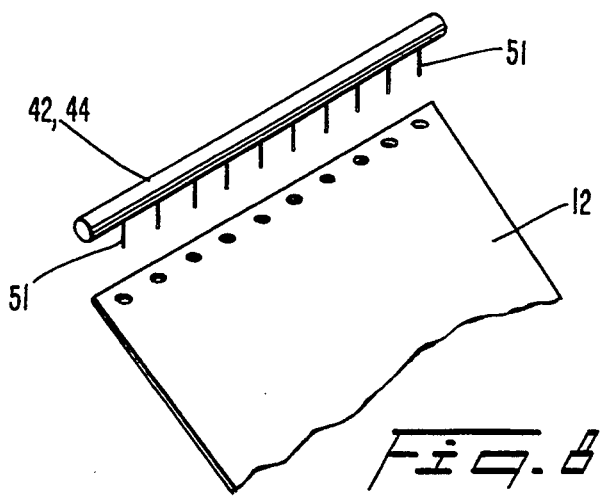

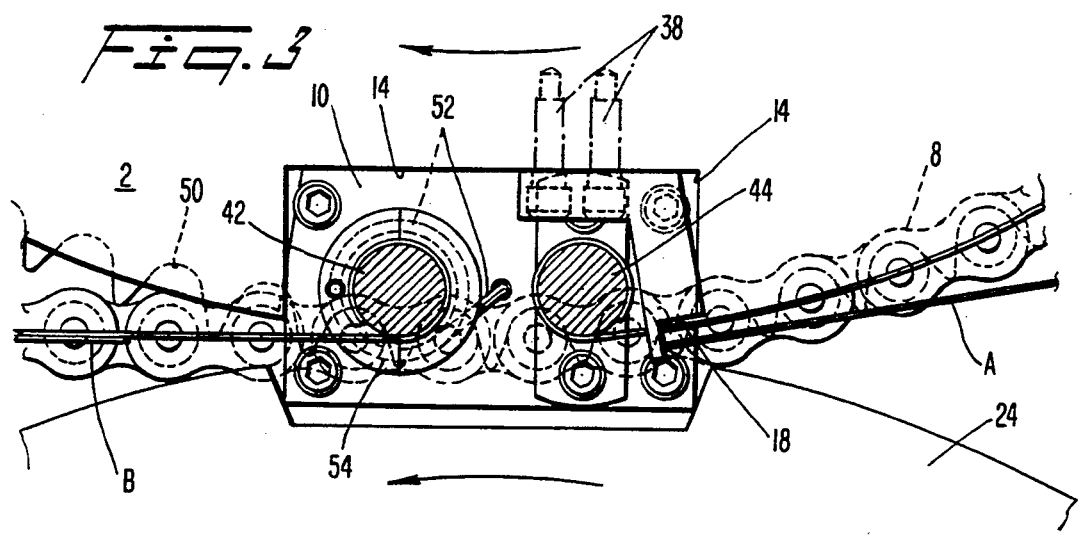
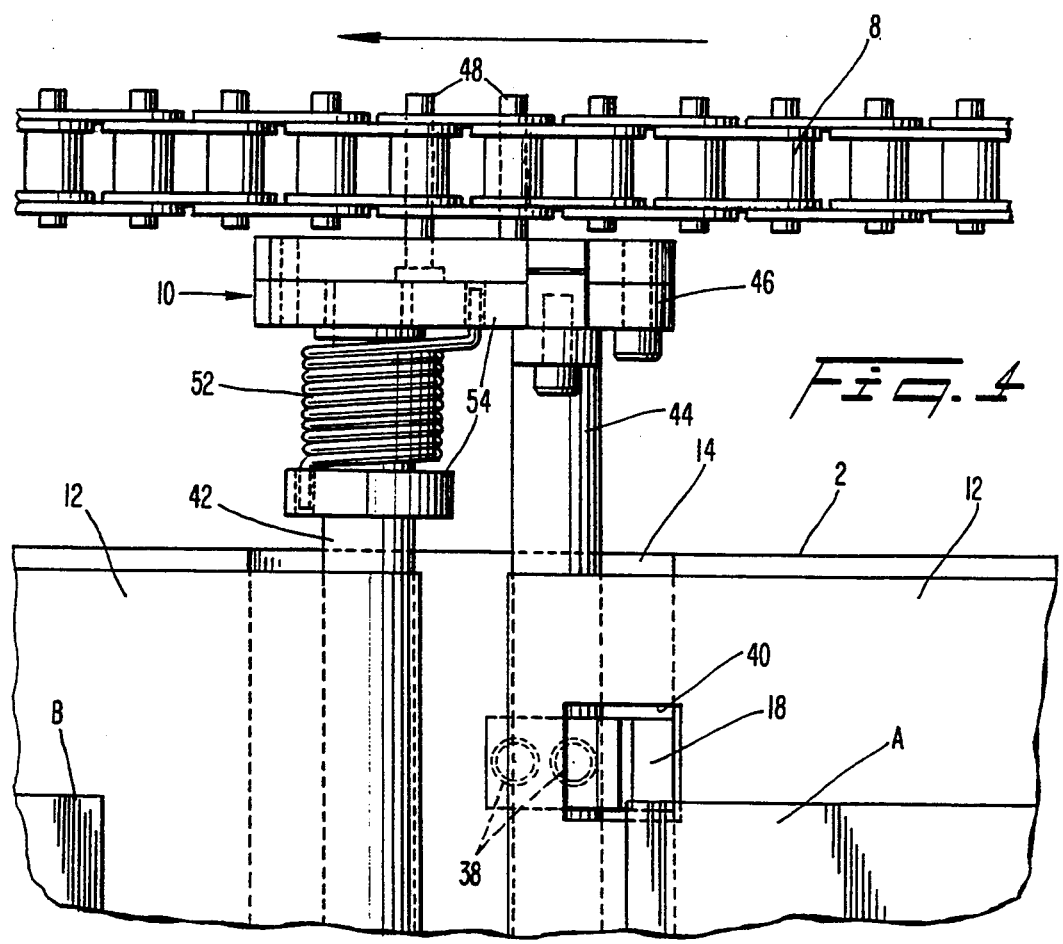

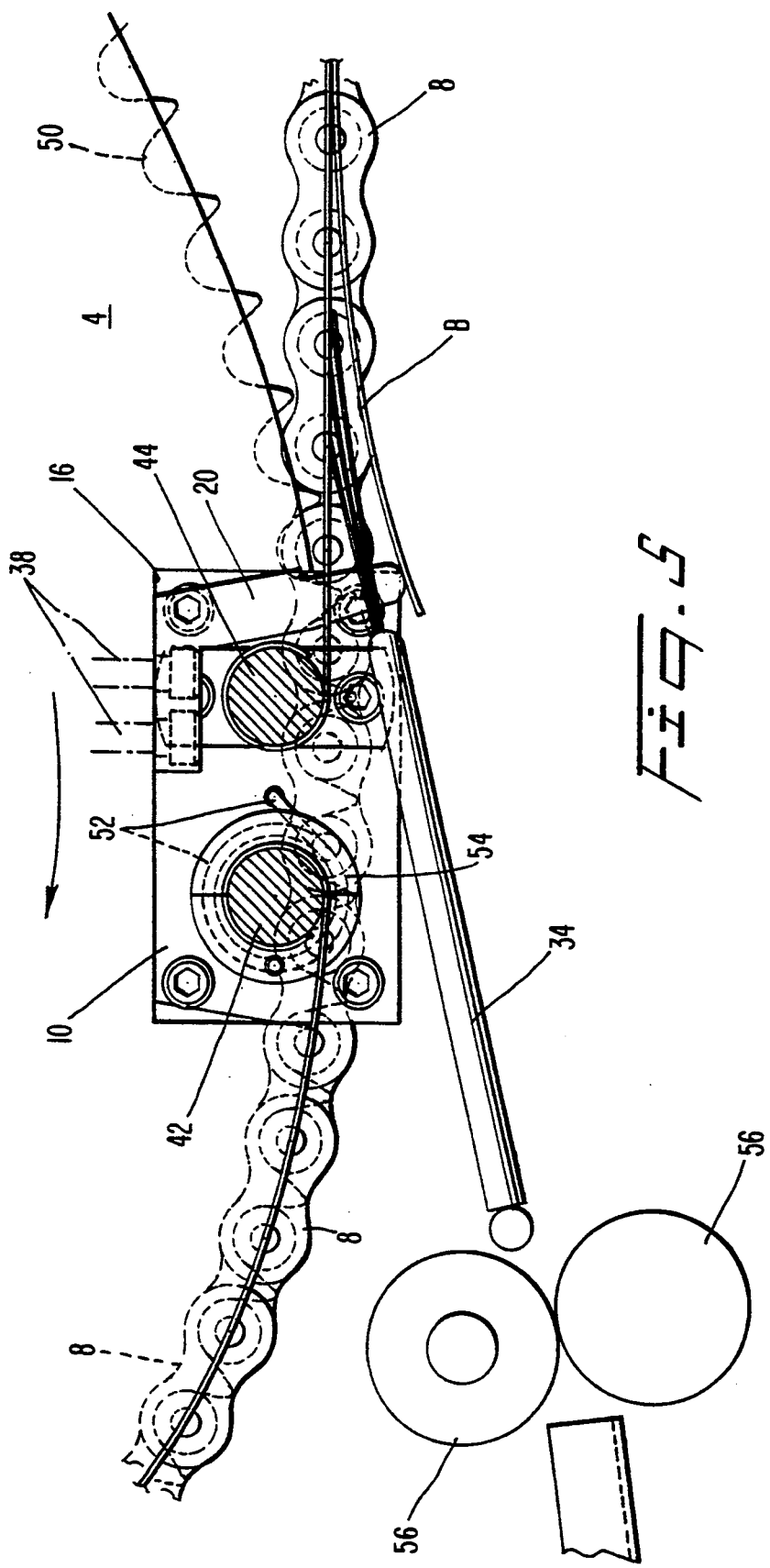

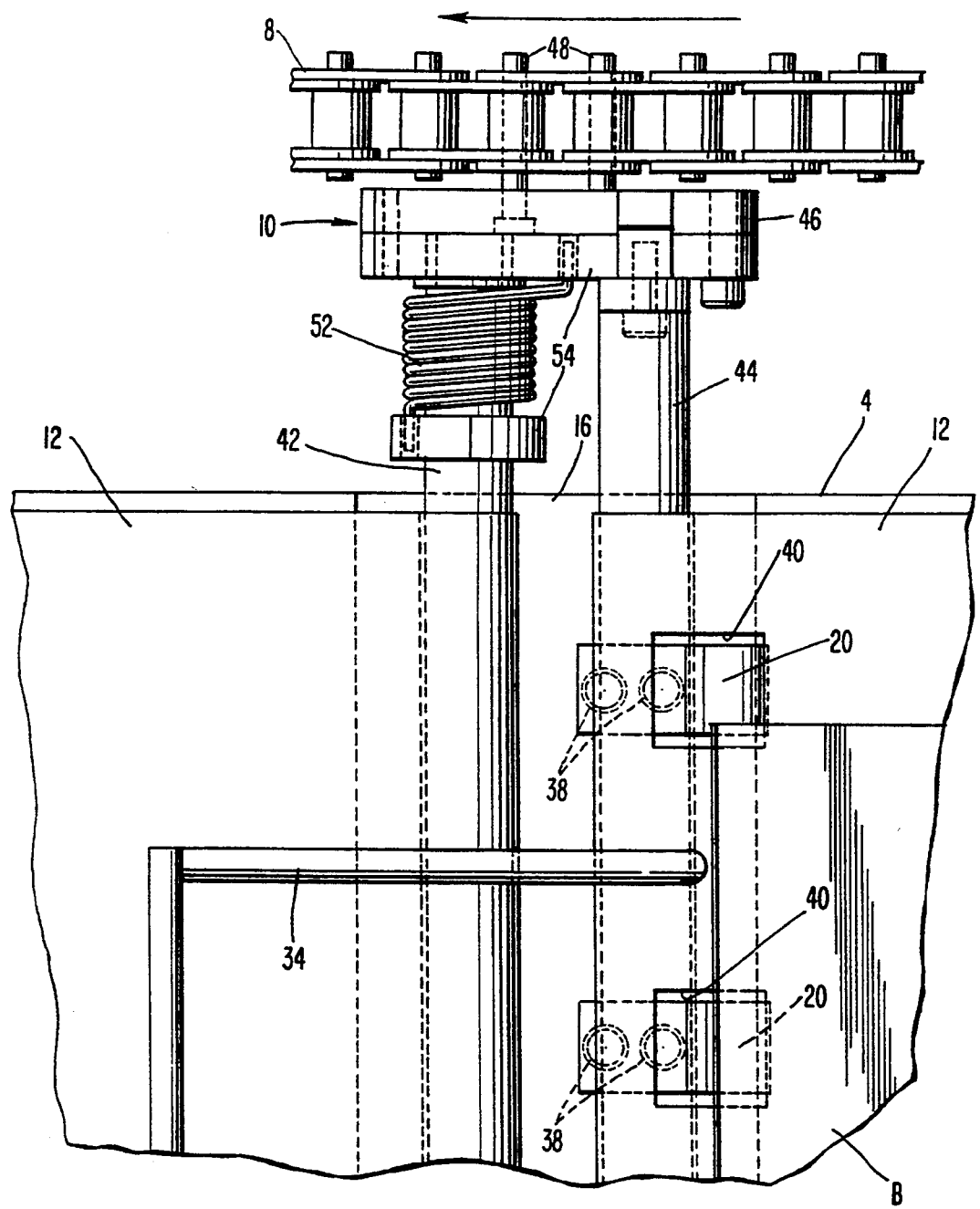

METHOD FOR HIGH-SPEED CALENDERING

This application is a divisional of application Ser. No. 07/928,358, filed Aug. 12, 1992 (now U.S. Pat. No. 5,275,096).

FIELD OF THE INVENTION

The present invention relates to a method and apparatus for treating the surface of a sheet by pressing it between two revolving cylinders. In particular, the present disclosure relates to a sheet calendering apparatus including a conveyor for carrying a coated sheet through a mechanism which applies heat and pressure followed by cooling and delivery of the finished sheet.

BACKGROUND OF THE INVENTION

In the an of printing, a variety of substrates must be coated with glossy finishes. These substrates are typically sheets of paper or cardboard; however, the term "sheet" also includes any other flat surface or substrate such as fabric, boxes, magazines, newspaper inserts, and bonding thermoplastic substrates.

There are basically two broad classes of coatings which are used in many conventional printing processes. The first class of coatings may be referred to as acrylic polymers. Acrylic polymer coatings are typically soluble in water, or in a solvent, and are suspended or dissolved in a solution before being applied to a substrate. Once applied to the substrate, acrylic polymer coatings may be cured by applying heat to evaporate the water or solvent base. The second class of coatings used in many conventional printing operations may be referred to as ultra-violet polymers. These coatings are cured using ultra-violet light to bond, or polymerize, monomer molecules in the coating.

Ultra-violet polymer coatings are generally preferred in many conventional coating processes for their superior aesthetic properties. Ultra-violet coatings tend to produce glossier finishes than acrylic coatings due to their flow characteristics and the larger mount of solid material that remains on the substrate after curing. In order to achieve comparably glossy finishes with acrylic coatings, more coating material must be applied to the substrate which then decreases the smoothness of the acrylic finish.

Although ultra-violet polymer finishes may be preferred in conventional coating processes for aesthetic reasons, ultra-violet coating processes have significant drawbacks. For example, the ozone which is produced as a by-product of curing with ultra-violet radiation has been found to threaten air quality. In addition, paper products which are coated with ultra-violet polymers are often difficult to recycle. Water-based acrylic coatings, on the other hand, are much easier to recycle and do not require ultra-violet radiation for curing. Consequently, there is a long felt and continuing need to improve the aesthetic qualities of sheets that are coated with acrylic polymers, and other coatings, in order to avoid the environmental problems associated with ultra-violet polymer coating materials.

Many recyclable surface finishes, including acrylic polymers, are activated by heat and pressure. Such coating materials are typically applied to sheets in liquid form and then allowed to air dry. The coated and dried sheets are then pressed against a heated, flat surface for a certain period of time and then allowed to gradually cool before being stripped from the surface. In order to create an acceptable finish on the sheet, the texture, temperature, and pressure of the compression surface along with the heating time and pressure must be tightly controlled during the finishing process. There is also a need to automate and increase the speed of the process in order to maximize the number of sheets which may be finished during any give time period while still producing a high quality surface finish.

A known sheet calendering device has used one continuous, mirror-finished belt arranged between two cylinders. Sheets are fed onto the belt at one end of the process and then heated, with steam, and compressed between the belt and a third cylinder. The steam-heated sheets are then cooled with a liquid coolant prior to their delivery at the other end of the process. One disadvantage of using such continuous belt arrangements for sheet calendering is that the entire belt must be replaced when even just a small portion of the belt is damaged. It is also difficult to maintain sufficient tension in the belt, particularly in long belts, to ensure proper belt tracking and minimize vibrations at high speeds. Furthermore, steam heating systems are complicated to build and difficult to operate and maintain. And finally, it is difficult to position sheets on the belt at the feed end of the apparatus and to remove the cooled sheet from the belt at the delivery end of the apparatus. Although the effects of many of these problems on surface finish quality can be minimized by using ultra-violet polymer coatings, acrylic coatings are often preferred for environmental reasons. Consequently, it is the object of the present invention to provide a high speed sheet calendering apparatus which overcomes these and other disadvantages of conventional sheet calendering technology.

SUMMARY OF THE PREFERRED EMBODIMENTS

The present disclosure relates to a method of and apparatus for sheet calendering. One embodiment of the apparatus includes a calendering cylinder, an impression cylinder, a delivering cylinder, and a conveyor for transporting sheets from the calendering cylinder to the delivering cylinder. The conveyor may include a pair of flexible elongated members, such as drive chains, arranged in endless loops around each side of the calendering and delivering cylinders. A plurality of flexible calendering plates may then be arranged end to end between the drive chains. The calendering plates are connected to the drive chains by support members arranged between the drive chains. Each of the calendering plates may be removeably attached to corresponding support members by pins. A tensioning mechanism may be provided on each support member for individually tensioning the calendering plates between the support members to which it is attached. The tensioning mechanism may include a shaft, which can be rotationally biased by a torsional spring, about which an end of the tensioned calendering plate is wrapped.

The calendering cylinder may include at least one stop member adapted to protrude radially through a hole in at least one of the calendering plates for aligning a sheet on the calendering plate. Similarly, the delivering cylinder may include at least one finger which radially protrudes through a hole in at least one of the calendering plates for pushing an edge of a sheet aligned on the calendering plate away from the surface of the plate. The apparatus may also include an air rake located proximate to the delivering cylinder for assisting the removal of the sheet from the calendering plate.

The apparatus may further include means for spraying at least one of the calendering plates with a coolant mist, means for blowing air over one of the calendering plates, and means for heating the calendering cylinder. The spraying means may include an ultrasonic sprayer. The blowing means may include one or more blower hoods. A dwell cylinder may be arranged at one end of the conveyor in order to urge sheets into contact with the heated calendering cylinder before the sheets are transported between the calendering cylinder and the delivering cylinder. A pair of bearers may be arranged on each side of the calendering cylinder to engage a pair of bearers arranged on each side of the impression cylinder in order to support the cylinders.

One embodiment of a method for calendering a sheet aligned on a flexible plate, wherein a series of such plates forms a surface of an endless belt extending between a heated calendering cylinder and a delivering cylinder, includes the steps of rotating the cylinders to drive the belt, aligning the entire sheet on a surface of the flexible plate, passing the plate and aligned sheet through a nip formed by the heated calendering cylinder and an impression cylinder, cooling the plate as it travels between the heated calendering cylinder and the delivering cylinder, and removing the sheet from the plate as the plate rotates around the delivering cylinder. The aligning step may be effected by disposing an edge of the sheet against at least one stop which protrudes through the plate as the plate rotates around the calendering cylinder. The removing step may be assisted by a finger which protrudes through the hole in the plate as the plate rotates around the cylinder. The plate may be cooled by applying a mist to the plate on a side of the plate opposite to the surface in contact with the sheet, and each of the plates may be individually tensioned in a direction parallel to the direction of travel of the plate on the endless belt. The tensioning may be effected by wrapping the calendering plates around a shaft which moves with the endless belt.

An apparatus for treating individual sheets includes an endless belt of flexible plates arranged end to end, means for aligning the entirety of each sheet on a surface of a single one of the flexible plates, heated means for pressing a surface of the sheet against a surface of the flexible plate, means for cooling each plate after it passes from the heated pressing means, and means for removing each sheet from its respective plate. Each plate may include at least one hole through which at least one first member protrudes to provide a stop for aligning an edge of the sheet on the plate and through which at least one second member intermittently protrudes to lift an edge of each sheet from its plate to facilitate removal of the sheet from the plate. Each plate may be held to adjacent plates by a support member transversely extending across the belt such that each plate is individually removable and replaceable. The support member may include a mechanism for tensioning at least one of the plates.

BRIEF DESCRIPTION OF THE DRAWINGS

The invention will now be further described with reference to the following figures wherein like elements are provided with the same reference numerals.

FIG. 2 is an enlarged view of the sheet feeding end of a presently preferred embodiment of the present invention.

FIG. 3 is an enlarged side view of one portion of the apparatus of FIG. 1 showing a sheet being received between the calendering cylinder and the impression cylinder at one end of the apparatus.

FIG. 4 is a bottom plan view of the portion of the apparatus illustrated in FIG. 3.

FIG. 5 is an enlarged side view of one portion of the apparatus of FIG. 1 showing a sheet being ejected under the delivering cylinder.

FIG. 6 is a bottom plan view of the portion of the apparatus illustrated in FIG. 5.

FIG. 7 is a partial section view taken along section line 7—7' in FIG. 1,

FIG. 8 is an isometric view of one technique for removeably attaching a calendering plate to a calendering plate support shaft.

DESCRIPTION OF THE PREFERRED EMBODIMENTS

Figure 1:
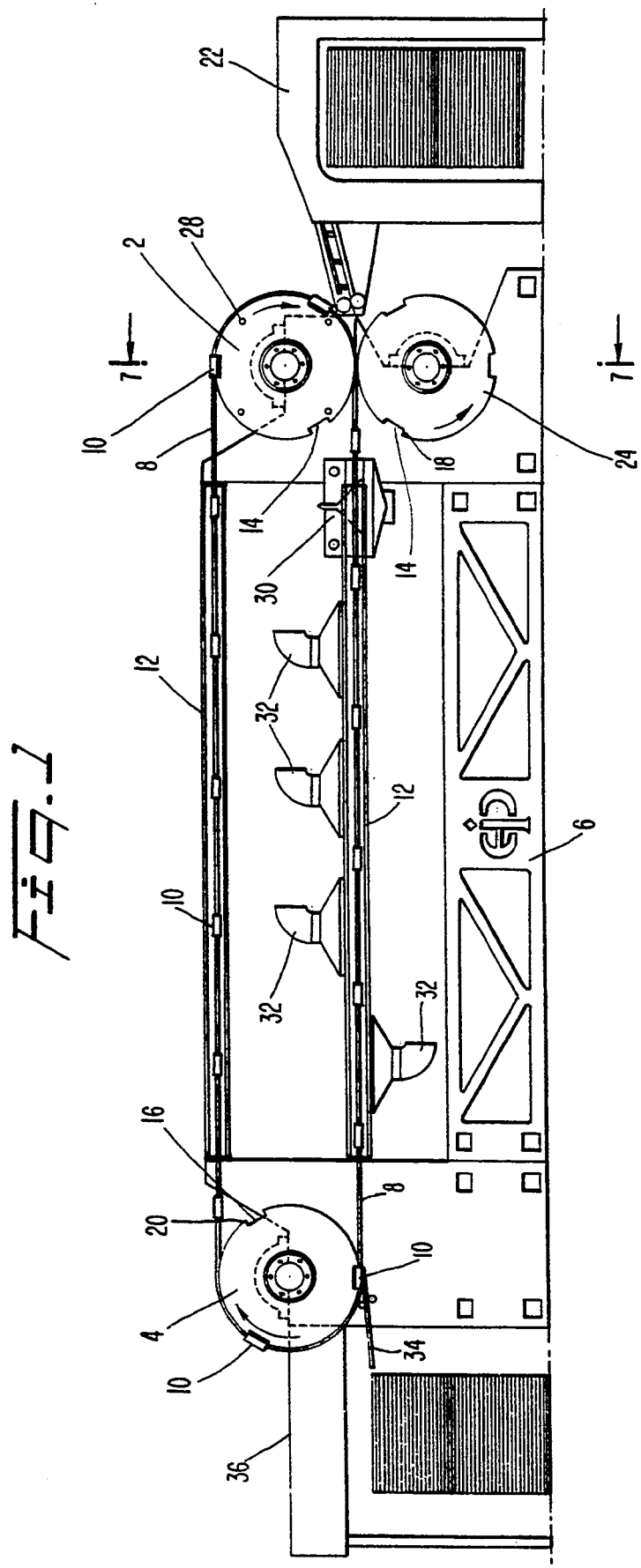
FIG. 1 is a side view of one embodiment of a high speed calendering apparatus according to the present invention.
Figure 1:
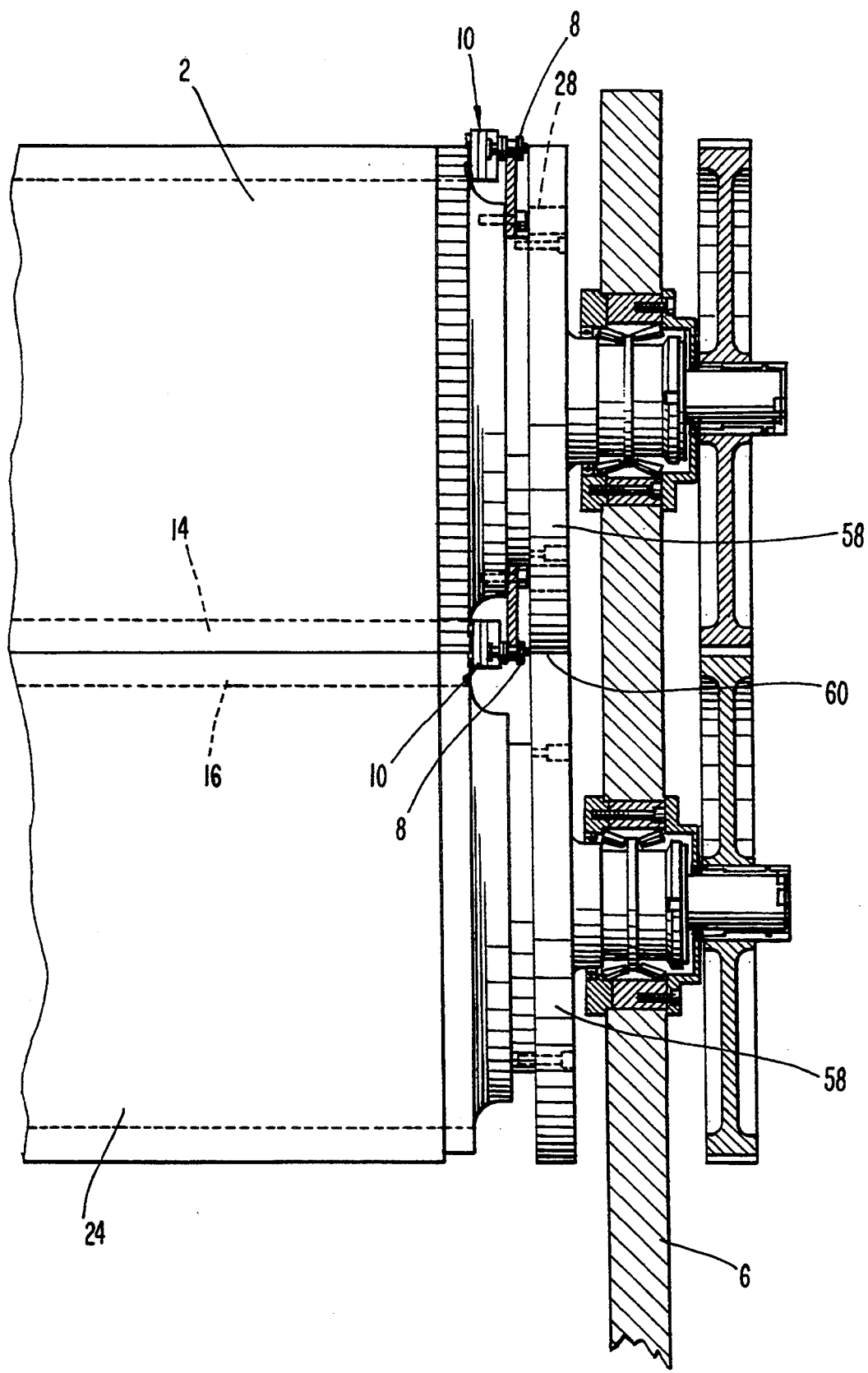

As illustrated in FIG. 1, calendering cylinder 2 and delivering cylinder 4 are arranged on frame 6 to form a conveyor for transporting sheets between the calendering cylinder 2 and the delivering cylinder 4. The conveyor includes two flexible elongated members which form parallel, endless loops around the calendering cylinder 2 and the delivering cylinder 4. In a preferred embodiment, these two flexible elongated members positively engage each cylinder to allow the conveyor to move at high speeds. For example, drive chains 8 mesh with sprockets on each side of the calendering cylinder 2 and the delivering cylinder 4 in order to allow the conveyor to rotate at high speeds. Of course, other types of flexible, essentially inextensible elongated members and positive engagement arrangements may also be used.

A plurality of support members 10 are attached between the drive chains 8. A calendering plate 12 is then arranged between each support member 10 to form an endless belt. The calendering cylinder 2 and delivering cylinder 4 both include recessed portions 14 and 16 which extend along the length of each cylinder for receiving support members 10 as the conveyor rotates around the cylinders. As will be described in more detail below, each recessed portion 14 on calendering cylinder 2 may include a plurality of stops 18 for aligning sheets on calendering plates 12. Similarly, each recessed portion 16 on delivering cylinder 4 may include a plurality of fingers 20 for removing sheets from the calendering plates 12 at the other end of the conveyor.

During normal operation, sheet feeder 22 holds a stack of prepared sheets which are consecutively fed onto calendering plates 12 between calendering cylinder 2 and impression cylinder 24. The term "sheet," as used here, refers to any thin fiat surface including paper, cardboard, fabric, folded boxes, or other substrates such as bonding thermoplastic substrates. The sheets are preferably prepared by coating them with a water based acrylic polymer and then thoroughly drying the coating in a conventional drying process before loading the sheets into sheet feeder 22. However, other coating materials may also be used. As will be described in more detail below, each of the sheets is aligned on the conveyor by disposing the leading edge of the sheet against at least one stop 18 which protrudes through calendering plate 12 in the pinch between calendering cylinder 2 and impression cylinder 24. Each of the sheets is then compressed between the impression cylinder 24 and the calendering plates 12 as the conveyor rotates clockwise around calendering cylinder 2 as shown in FIG. 1.

The calendering cylinder 2 is preferably heated to a temperature at which sufficient heat is transferred through the calendering plates 12 to the sheets so as to melt the coating on the sheets and cause the sheets to stick to the calendering plates 12. The amount of heat transferred to the sheets will depend on the amount of time that each sheet spends pressed against the heated calendering 2 and the temperature of the heated calendering cylinder. In order to allow faster conveyor speeds, the calendering cylinder 2 may be heated to a higher temperature in order to transfer the same amount of heat to the sheets as would be transferred at lower conveyor speeds. However, it is preferable to operate the heated calendering cylinder 2 at the lowest possible temperature in order to minimize heat losses to the environment and to prevent damage to the sheets. Consequently, in order to operate the heated calendering cylinder at high speeds and low temperatures, it is preferable to maximize the amount of time that each sheets spends pressed against the heated calendering cylinder 2.

Accordingly, a preferred embodiment of the present invention includes a dwell cylinder 26 arranged at the feeder end of the conveyor. As illustrated in FIG. 2, dwell cylinder 26 urges sheet A against the heated calendering cylinder 2 upstream of the nip between the calendering cylinder and the impression cylinder 24. The sheet A therefore spends more time (i.e., dwells) against the heated calendering cylinder 2. Consequently, the conveyor may be run at higher speeds for any given temperature of the heated calendering cylinder 2. Of course, the impression cylinder 24 and/or the dwell cylinder 26 may also be heated. However, applying heat to the uncoated side of the sheet can cause the sheet to become yellow and brittle. In a preferred embodiment, the speed of the conveyor is maintained between 500 and 600 feet per minute while the temperature of the calendering cylinder is maintained in the range of 180° F. to 220° F., but preferably 200° F. for conventional types of materials. Higher temperatures may cause the coating to yellow and become brittle while lower temperatures may not provide enough heat to melt the coating on the sheets.

The calendering cylinder 2 may be heated by any conventional means such as electrical resistance or steam heating. However, the calendering cylinder 2 is preferably heated using flux induction because of its environmental safety. It has been found to be important to maintain an even temperature distribution across the surface of heated calendering cylinder 2. Accordingly, heated calendering cylinder 2 may include several holes 28 arranged near the outer circumference of calendering cylinder 2. The holes 28 preferably extend from one end of calendering cylinder 2 to the other end are partially filled with a heat transfer medium. In practice, heated calendering cylinder 2 may include several holes which are equally spaced around the outer circumference of calendering cylinder 2. The holes 28 are preferably capped at each end once they are partially or completely filled with the heat transfer medium. The heat transfer medium is preferably chosen so that its boiling temperature is at or near the temperature of heated calendering cylinder 2. Suitable induction cylinders and heat transfer medium may be obtained from the Tokuden Company of Japan.

Each of the sheets is compressed between the impression cylinder 24 and a calendering plate 12 as the calendering plates move around the lower portion of calendering cylinder 2. Advantageously, the calendering plates 12 should therefore be flexible and heat conductive. The plates should also have a surface finish which does not degrade during use. It has been found by the present inventors that although thinner calendering plates conduct heat more quickly from the heated calendering cylinder 2, thin calendering plates are also more easily damaged during use. Thin calendering plates also require higher tension in order to provide a smooth compression surface for the sheets while increased tension has been found to promote stress fatigue and failure of the calendering plates 12. The calendering plates 12 are therefore preferably made from 0.024 inch thick stainless steel and provided with a tension of between 150 and 350 pounds. Less tension may allow the calendering plates 12 to flutter while greater tension may damage the stainless steel. The calendering plates 12 may also be provided with a mirror surface finish, such as 2 RMS or better, for making smooth surface finishes or a textured surface finish for making designs or patterns in the coating on the heated sheets. However, a wide variety of materials, thicknesses, finishes, and tensions may also be used.

Once the surface of a sheet has been heated to a temperature sufficient to melt the coating, the sheet will stick to the outside surface of calendering plate 12. Of course, means for gripping the sheets against calendering plates 12 may also be used if the coating does not become sufficiently tacky to support the sheets against calendering plates 12. The sheet is then moved further downstream on the conveyor to spray system 30. The spray system 30 is preferably ultrasonic in order to emit a fine mist of coolant against the bare side of calendering plate 12 on the opposite side from the sheet. The coolant is preferably a water mist, however, any other type of evaporative coolant may also be used. The mist is evaporated by the heat from the backside of calendering plate 12 and the resulting steam may be removed through a series of blower hoods 32. A stream of liquid coolant, such as water, may also be used instead of a mist. However, it has been found that mist evaporation provides greater heat transfer capability than simple liquid convection. Using mist also prevents liquid coolant from seeping onto the sheets on the other side of the calendering plates 12. The mist may be continuously applied to one side of the calendering plates 12, or alternatively, the mist may be controlled so as to intermittently spray each calendering plate as it is moved into position under the mist nozzle.

As the sheets are moved further downstream on the conveyor, the blower hoods 32 may draw air over the calendering plates 12 in order to further cool the plates and draw away any remaining evaporated mist. In a preferred embodiment, the final blower hood is arranged on the same side of calendering plate 12 as the sheet so that air can be circulated directly over the sheet instead of on the backside of calendering plate 12. The speed of air drawn through each of the hoods 32 may be controlled so as to provide an appropriate cooling rate for the sheets on calendering plates 12. In fact, the speed of the conveyor, the temperature of the calendering cylinder, the rate of coolant applied, and the air speed of the blowers may all be controlled so as to provide an appropriate rate of cooling for the sheets. The sheets are then removed from the conveyor at delivering cylinder 4 with the aid of fingers 20 and air rake 34 before being placed in another stack in sheet receiver 36.

FIGS. 3 and 4 illustrate the conveyor, travelling from right to left, carrying a downstream sheet B and receiving an upstream sheet A. Upstream sheet A is fed against the tip of stop 18 which protrudes through calendering plate 12 when the calendering plate is rotated to the bottom of calendering cylinder 2. Several stops 18 may be attached with any conventional means such as bolts 38 inside each of the recessed portions 14 which extend along the length of calendering cylinder 2. Stops 18 provide a positive head stop for sheet A as it is fed from feeder 22. Of course stop 18 could also be arranged to rotate or fall into position, for example, by gravity. Each stop 18 may include a notched portion for receiving the leading edge of upstream sheets A. As illustrated in FIG. 4, stop 18 aligns the downstream edge of sheet 2 to cover about half the length of hole 40 in calendering plate 12.

FIGS. 3 and 4 also illustrate how each end of the calendering plates 12 are supported between drive chains 8 by spaced support members which extend transversely between the drive chains. Upstream plate support shaft 42 and downstream plate support shaft 44 may be connected to drive chain 8 via calendering plate support connector 46. Although only one connector 46 is shown in FIG. 4, the apparatus may also include connectors 46 on both sides of the support members 10. The calendering plate support connectors 46 are preferably attached to drive chain 8 through one of its links by studs 48.

The calendering plate support connector 46 maintains an appropriate distance between the upstream shaft 42 and the downstream shaft 44. The calendering plate support connector 46 may be sized to fit inside recessed portion 14 and 16 so that the surface of calendering plate 12 fits snugly against the outer peripheral surface of calendering cylinder 2. However, as illustrated in the Figures, the width of the calendering cylinder 2 may be chosen so that only the plate support shaft 42, 44 and a mid-plate support bracket (not shown) actually fit inside the recessed portions 14, 16. Impression cylinder 24 may also include recessed portions for receiving the support members and allowing the stops 18 and fingers 20 to protrude through the calendering plates 12. The pitch diameter of the drive chain sprockets 50 is preferably the same as the diameter of the cylinders 2, 4 plus the thickness of calendering plate 12 so that the speed of the sheet contact surface remains constant as the calendering plates are wrapped around the cylinders 2, 4.

The downstream end of each calendering plate 12 may be fixed to downstream plate support shaft 44. In addition, the downstream end of each calendering plate 12 will also include one or more holes 40 through which stops 18 and fingers 20 will protrude as the calendering plates 12 rotate around the cylinders 2 and 4. In a preferred embodiment, each calendering plate 12 includes several slot-shaped holes 40 spaced across the calendering plates across the width of the calendering plate at its downstream end for receiving one stop 18 or finger 20 through each hole. The upstream end of each calendering plate 12 may then be attached to an upstream plate support shaft 42 by any conventional means such as bolting or clipping.

FIG. 8 illustrates a preferred technique for removeably attaching the calendering plates 12 to the plate support shafts 42, 44. Although only one support shaft is illustrated in FIG. 8, in practice a series of pins 51 may extend radially from the circumference each of the support shafts 42, 44. The calendering plate 12 includes corresponding holes for receiving the pins 51. Once the pins 51 are received in the holes the calendering plate 12 may be wrapped approximately 270 degrees around each plate support shaft 42, 44 in order to take up slack in the calendering plate 12 before tensioning the plate. This arrangement allows the calendering plates 12 to be quickly and easily changed without special tooling or skills.

Referrring once more to FIGS. 3 and 4, upstream plate support shaft 42 may rotate in order to to help remove slack and maintain a constant tension in the calendering plate 12. For example, the rotation can be used to compensate for thermal expansion and contraction during a complete revolution of the conveyor. The rotation of upstream plate support shaft 42 also allows for the length of the pitch line of the chain to change as the chain goes from a straight horizontal between the cylinders 2, 4 to an arc on drive chain sprockets 50.

A torsion spring 52 or similar tensioning device may be arranged on each upstream plate support shaft 42 to apply a torque to shaft 42 in order to help maintain the tension in calendering plate 12. To this end, calendering plate support connector 46 and upstream plate support shaft 42 may be provided with spring locks 54. Torsion spring 52 urges upstream plate support shaft 42 to rotate counterclockwise in FIG. 3 in order to wrap the upstream end of calendering plate 12 around upstream plate support shaft 42. Of course, downstream plate support shaft 44 may also be arranged to provide an appropriate tension in each calendering plate 12. The preferred tension for each calendering plate is between 150 and 350 pounds.

FIGS. 5 and 6 illustrate enlarged views of the delivery end of the apparatus where downstream sheet B, travelling from right to left, is being removed from calendering plates 12. As noted above, delivering cylinder 4 includes several recessed portions 16 arranged along the circumference of the cylinder. Recessed portions 16 house fingers 20 which may be arranged to rotate inside recessed portion 16. Each finger 20 may include a rounded tip for abutting against one side of the leading edge of sheet B in order to push the leading edge of downstream sheet B away from the surface of calendering plate 12 as illustrated in FIG. 5. As delivering cylinder 4 continues to rotate, sheet 2 is separated from calendering plate 12 and fed to sheet receiver 36. Air rake 34 may further assist the separation of sheet B from calendering plate 12 by providing a jet of air between the sheet and the calendering plate. Air rake 34 may include pinch rollers 56 for guiding and urging sheet B to sheet receiver 36. After fingers 20 initiate separation, a blast of air from air rake 34 continues the separation so that the sheet is physically prevented from remaining on calendering plate 12.

FIG. 7 illustrates a bearer support structure for calendering cylinder 2 and impression cylinder 24. As noted above, heat and pressure are applied to the sheets as they are forced into the nip or pinch between calendering cylinder 2 and impression cylinder 24. This pressure is generally between 80 and 120 pounds per linear inch. A greater pressure may damage the sheets 2 while less pressure may not provide enough force to create the desired finish. The actual pressure required depends upon the temperature, conveyor speed, coating material, and substrate being used.

In order to help control the pinch pressure, bearers 58 may be provided on one or both sides of calendering cylinder 2 and impression cylinder 24. The bearers 58 are typically formed from hardened steel in the shape of wheels that are about 2 inches wide at their outer surface. A face loading may be applied between calendering cylinder 2 and impression cylinder 24 by a pneumatic air cylinder (not shown). When the adjacent faces of two cylinders 2, 24 are loaded, the two bearers 58 will engage at contact surface 60 in order to support a portion of the weight of calendering cylinder 2 and impression cylinder 24. The face loading of the calendering and impression cylinders 2, 24 is preferably removed when each recessed portion 14, 16 rotates around to the nip in order to recieve another sheet. However, the bearers may remain in contact when the face loading is removed in order to continue to support some of the load between the cylinders 2, 24 and thus help reduce vibratory shock loads as the conveyor rotates.

The pinch pressure between calendering cylinder 2 and impression cylinder 24 can be accurately adjusted by changing the thickness of some circumferential padding on either cylinder. In a preferred embodiment, impression cylinder 24 is coated with a temperature resistant, synthetic rubber or plastic, printing blanket for controlling the pressure between impression cylinder 24 and calendering cylinder 2 and also for absorbing some of the impact as sheets are fed between the cylinders. The nip pressure between calendering cylinder 2 and impression cylinder 24 may be adjusted by packing a material, such as 0.003 to 0.007 inch thick MYLAR brand polyester film, between the printing blanket and the surface of impression cylinder 24.

In normal operation of the apparatus illustrated in FIG. 1, either the calendering cylinder 2 or the delivering cylinder 4 (or both) are rotated by an external source of power such as an electric motor (not shown). A sheet which has been received between dwell cylinder 26 and calendering cylinder 2 from sheet feeder 22 is aligned on the surface of calendering plates 12 against stops 18 by sheet feeder 22. The sheet on calendering plate 12 is then passed through the pinch between heated calendering cylinder 2 and impression cylinder 24 where the coating on the sheet is heated and becomes tacky enough to stick the sheet to the surface of calendering plate 12. The sheet may also be held onto calendering plate 12 using conventional gripper bars. The calendering plate is then cooled by mist from spray system 30 and air from blower hoods 32 as it travels further down the conveyor between heating calendering cylinder 2 and delivering cylinder 4.

Finally, the sheet is removed from calendering plate 12 as the plate rotates around the delivering cylinder 4. Removal of the treated sheet may be assisted by fingers 20 which protrude through holes 40 in calendering plate 12 as the calendering plate rotates around delivering cylinder 4. Alternatively, the removal of the treated sheets could also be carried out utilizing conventional gripper bars. The removal may also be assisted by air rake 34 arranged near delivering cylinder 4.

The principles, preferred embodiments, and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present invention as defined by the following claims.

What is claimed is:

1. A method of calendering a sheet aligned on a flexible plate, wherein a series of such plates forms a working surface of an endless belt looped around and driveable in a direction of travel by a heated calendering cylinder and a delivering cylinder, comprising the steps of:
   rotating the cylinders to drive the belt;
   aligning the entire sheet on a surface of the flexible plate;
   passing the plate and aligned sheet through a nip formed by the heated calendering cylinder and an impression cylinder;
   cooling the plate as it travels between the heated calendering cylinder and the delivering cylinder; and
   removing the sheet from the plate as the plate travels around the delivering cylinder.

2. The method as claimed in claim 1, wherein the aligning of the sheet is effected by disposing an edge of the sheet against at least one stop which protrudes through the plate as the place travels around the calendering cylinder.

3. The method as claimed in claim 1, wherein the removing of the sheet from the plate is assisted by a finger movably mounted to the delivering cylinder which finger protrudes through a hole in the plate as the plate travels around the delivering cylinder.

4. The method as claimed in claim 1, wherein the cooling of the plate is performed by applying a mist to the plate on a side of the plate opposite to the surface in contact with the sheet.

5. The method as claimed in claim 1, further comprising the step of individually tensioning each of the plates in a direction parallel to the direction of travel of the plate.

6. The method as claimed in claim 5, wherein said tensioning is effected by wrapping the plates around a shaft which moves with said endless belt.

7. A method of treating individual sheets on an endless belt of heated flexible plates arranged end to end, said method comprising the steps of:
   aligning the entirety of each sheet on a surface of a single one of the flexible plates;
   pressing a surface of the sheet against a surface of said flexible plate;
   cooling each plate after said pressing step; and
   removing each sheet from its respective plate.

8. The method of claim 7, wherein each plate is held to adjacent plates by a support member transversely extending across the belt, each plate being individually removable and replaceable.

9. The method of claim 8, further comprising the step of individually tensioning at least one of the plates.

10. The method as claimed in claim 7, wherein the aligning of the sheet is effected by disposing an edge of the sheet against at least one stop movably mounted to a calendering cylinder which protrudes through the plate as the plate travels around the calendering cylinder.

11. The method as claimed in claim 7, wherein the removing of the sheet from the plate is assisted by a finger movably mounted to a delivering cylinder which finger protrudes through a hole in the plate as the plate rotates around the delivering cylinder.

12. The method as claimed in claim 7, wherein the cooling of the plate is performed by applying a mist to the plate on a side of the plate opposite to the surface in contact with the sheet.

* * * * *